United States Patent
Lee et al.

(10) Patent No.: US 7,297,187 B2
(45) Date of Patent: Nov. 20, 2007

(54) GAS SEPARATION APPARATUS

(75) Inventors: Don-Hee Lee, Gyeonggi-Do (KR); Seong-Moon Cho, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 10/891,065

(22) Filed: Jul. 15, 2004

(65) Prior Publication Data

US 2005/0011360 A1 Jan. 20, 2005

(30) Foreign Application Priority Data

Jul. 16, 2003 (KR) .................. 10-2003-0048689

(51) Int. Cl.
*B01D 53/047* (2006.01)
(52) U.S. Cl. .................. 96/121; 96/143
(58) Field of Classification Search .......... 96/108, 96/121–133, 143; 95/95, 96; 128/204.18, 128/205.12, 205.18, 205.27
See application file for complete search history.

(56) References Cited

U.S. PATENT DOCUMENTS

| | | | | |
|---|---|---|---|---|
| 4,449,990 A | * | 5/1984 | Tedford, Jr. | .................. 95/26 |
| 4,715,867 A | * | 12/1987 | Vo | .................. 95/101 |
| 4,968,329 A | * | 11/1990 | Keefer | .................. 95/98 |
| 5,183,483 A | * | 2/1993 | Servido et al. | .................. 95/98 |
| 5,256,172 A | * | 10/1993 | Keefer | .................. 423/230 |
| 6,176,897 B1 | * | 1/2001 | Keefer | .................. 95/98 |
| 6,471,744 B1 | * | 10/2002 | Hill | .................. 95/19 |
| 2002/0121191 A1 | * | 9/2002 | Warren | .................. 95/11 |
| 2002/0127442 A1 | * | 9/2002 | Connor et al. | .................. 429/12 |

FOREIGN PATENT DOCUMENTS

CN 2381375 Y 6/2000

OTHER PUBLICATIONS

Office Action issued by the Patent Office of the People's Republic of China on Jun. 3, 2005 (English Full Text and Chinese Full Text).

* cited by examiner

*Primary Examiner*—Frank M. Lawrence
(74) *Attorney, Agent, or Firm*—Ked & Associates, LLP

(57) ABSTRACT

A gas separation apparatus comprises: at least two absorption beds respectively including an absorbent for absorbing certain gas; at least two three-way valves respectively installed on conduits for respectively connecting the absorption beds and outside of the apparatus; and a pump respectively connected to each end of the absorption beds and the three-way valves, for discharging gas absorbed by the absorbent and gas that is not absorbed by the absorbent. Gas that is absorbed by the absorbent and gas that is not absorbed by the absorbent are discharged by the single pump, thereby having a simple structure and reducing an installation space and a fabrication cost.

15 Claims, 4 Drawing Sheets

GAS SEPARATION APPARATUS

BACKGROUND OF THE INVENTION

1. Field of the Invention

The present invention relates to a gas separation apparatus, and more particularly, to a gas separation apparatus based on a vacuum swing absorption (VSA) method.

2. Description of the Conventional Art

Generally, a gas separation apparatus is for separating nitrogen and oxygen that are main components of the air from each other, and is used for domestic or industrial use.

The gas separation apparatus serves as both an oxygen generator and a nitrogen generator. As the oxygen generator, the gas separation apparatus is variously used for individual, domestic, automobile, emergency, industrial use, etc., and is recently used to increase a dissolved oxygen inside drinking water by being supplied to drinking water of a domestic water purifier. Also, as the nitrogen generator, the gas separation apparatus is used to generate nitrogen of a high purity for an industrial use, and is used to control a storage atmosphere for a long-term storage of food. The gas separation apparatus separates specific gas by sucking the air and thus transmitting the air to an adsorbent for absorbing specific gas or an enrichment membrane.

A method for sucking the air and thus transmitting to an absorbent or an enrichment membrane includes a pressure swing absorption (PSA) method for applying a pressure and generating a gas flow, and a vacuum swing absorption (VSA) method for lowering a pressure inside a conduit and generating an air flow using a pressure difference between the pressure inside the conduit and the air pressure.

As shown in FIG. 1, the conventional gas separation apparatus based on the VSA method comprises: first and second absorption beds 111 and 112 including an absorbent for absorbing specific gas; a vacuum pump 113 for forming a vacuum state inside the first and second absorption bends 111 and 112; a discharge pump 114 for discharging gas separated by the absorbent of the first and second absorption beds 111 and 112; a filter 115 for filtering external gas introduced into the first and second absorption beds 111 and 112; and first and second three-way valves 121 and 122 installed on a conduit that respectively connects the first and second absorption beds 111 and 112, the vacuum pump 113, and the filter 115, for selectively connecting the first and second absorption beds 111 and 112 to the vacuum pump 113, or selectively connecting the first and second absorption beds 111 and 112 to the filter 115, that is, the air.

Operation of the conventional gas separation apparatus based on the VSA method will be explained as follows.

First, a process for separating gas from the first absorption bed 111 and thereby discharging will be explained.

When the first absorption bed 111 and the vacuum pump 113 are connected to each other by an operation of the first three-way valve 121, the vacuum pump 113 is operated and thereby an inner pressure of the first absorption bed 111 is reduced thus to form a vacuum state. Also, when the first absorption bed 111 and the filter 115 (that is, outside of the gas separation apparatus) are connected to each other by the operation of the first three-way valve 121, a pressure difference between inside of the first absorption bed 111 and outside of the gas separation apparatus is generated. According to this, gas that has passed through the filter 115 is introduced into the first absorption bed 111. Among the gas introduced into the first absorption bed 111, certain gas is absorbed by the absorbent, and gas that has not been absorbed by the absorbent is discharged to outside of the gas separation apparatus by the operation of the discharge pump 114.

When the first absorption bed 111 and the vacuum pump 113 are connected to each other by an operation of the first three-way valve 121, gas that has been absorbed by the absorbent in the first absorption bed 111 is detached from the absorbent by a suction force of the vacuum pump 113. The gas detached from the absorbent passes through the vacuum pump 113 thus to be discharged to outside of the gas separation apparatus. At the same time, inside of the first absorption bed 111 is again in a vacuum state.

A process for separating gas from the second absorption bed 112 is the same as the process for separating gas from the first absorption bed 111. If operation periods of the first and second three-way valves 121 and 122 are alternately set, a discharge of separated gas by the vacuum pump 113 and the discharge pump 114 is consecutively performed. That is, when the vacuum pump 113 and the first absorption bed 111 are connected to each other by the first three-way valve 121, the filter 115 and the second absorption bed 112 are connected to each other by the second three-way valve 122. Also, when the filter 115 and the first absorption bed 111 are connected to each other by the first three-way valve 121, the vacuum pump 113 and the second absorption bed 112 are connected to each other by the second three-way valve 122.

Said operation is repeatedly performed, and gas that has not been absorbed by the absorbent in the first and second absorption beds 111 and 112 is discharged out through the discharge pump 114. Also, gas absorbed by the absorbent is discharged through the vacuum pump 113. Under this operation, when the absorbent has a characteristic to be absorbed with nitrogen, oxygen among the air introduced into the gas separation apparatus is discharged through the discharge pump 114, and nitrogen is discharged through the vacuum pump 113.

However, in the conventional gas separation apparatus based on the VSA method, the vacuum pump 113 for discharging gas absorbed by the absorbent and the discharge pump 114 for discharging gas that is not absorbed by the absorbent have to be all provided thus to have a high cost and have a complicated construction.

SUMMARY OF THE INVENTION

Therefore, an object of the present invention is to provide a gas separation apparatus capable of simplifying a construction thereof and reducing a fabrication cost by providing a vacuum pump for simultaneously discharging gas absorbed by an absorbent and gas that is not absorbed by the absorbent.

To achieve these and other advantages and in accordance with the purpose of the present invention, as embodied and broadly described herein, there is provided a gas separation apparatus comprising: at least two absorption beds respectively including an absorbent for absorbing certain gas; at least two three-way valves respectively installed on conduits for respectively connecting the absorption beds and outside of the apparatus; and a pump respectively connected to each end of the absorption beds and the three-way valves, for discharging gas absorbed by the absorbent and gas that is not absorbed by the absorbent.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
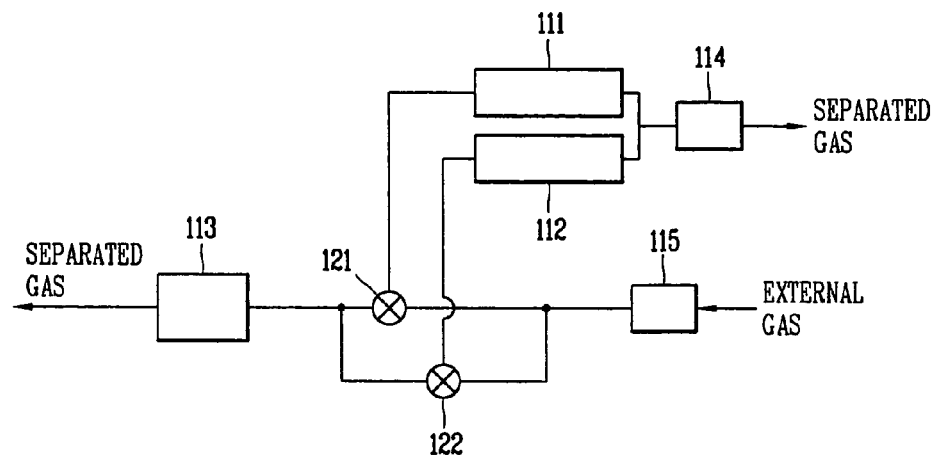
FIG. 1 is a schematic view showing a gas separation apparatus in accordance with the conventional art.
Figure 2:
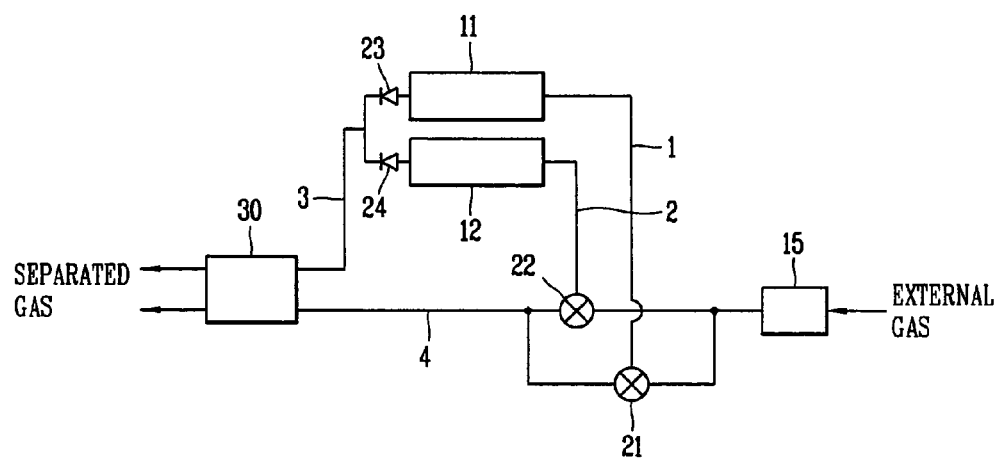
FIG. 2 is a schematic view showing a gas separation apparatus according to the present invention.

As shown in FIG. 2, the gas separation apparatus according to the present invention comprises: first and second absorption beds 11 and 12 respectively connected to outside by first and second conduits 1 and 2 thus to be arranged in parallel, and respectively including an absorbent for absorbing certain gas; a filter 15 installed on the first and second conduits 1 and 2 and filtering foreign materials included in sucked external gas; first and second three-way valves 21 and 22 installed on the first and second conduits 1 and 2; and a vacuum pump 30 connected to a third conduit 3 respectively connected to the first and second absorption beds 11 and 12, and connected to a fourth conduit 4 respectively connected to the first and second three-way valves 21 and 22, for simultaneously discharging gas absorbed by the absorbent and gas that is not absorbed by the absorbent.

It is preferable to install check valves 23 and 24 at a connection portion between the first absorption bed 11 and the third conduit 3 and at a connection portion between the second absorption bed 12 and the third conduit 3. The check valves 23 and 24 allows gas that is not absorbed by the absorbent in the first and second absorption beds 11 and 12 to be introduced into the third conduit 3, and prevents gas inside the third conduit 3 from backwardly flowing to the first and second absorption beds 11 and 12.

In the preferred embodiment of the present invention, two absorption beds are installed. Also, in case that the absorption beds more than two are installed, it is preferable to arrange the absorption beds in parallel.

Figure 3:
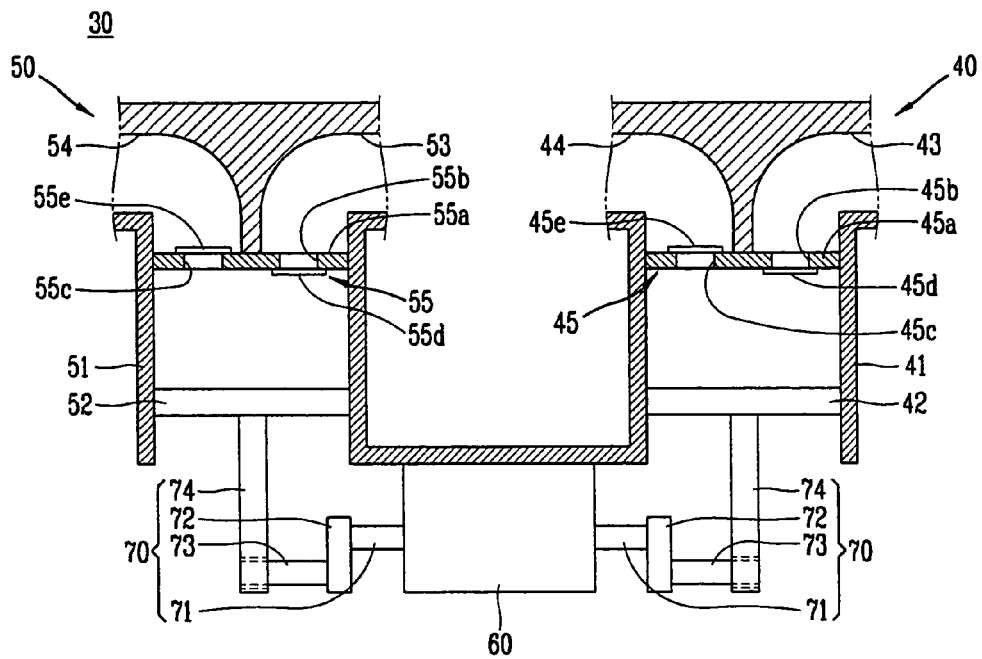
FIG. 3 is a sectional view showing a vacuum pump provided at the gas separation apparatus according to the present invention.

As shown in FIG. 3, the vacuum pump 30 comprises: a first discharge unit 40 connected to the third conduit 3 and discharging gas that is not absorbed by the absorbent in the first and second absorption beds 11 and 12; a second discharge unit 50 connected to the fourth conduit 4, for reducing an inner pressure of the first and second absorption beds 11 and 12 thereby forming a vacuum state, and detaching gas that has been absorbed by the absorbent in the first and second absorption beds 11 and 12 from the absorbent thereby discharging; and a driving motor 60 for simultaneously driving the first discharge unit 40 and the second discharge unit 50.

The first discharge unit 40 includes: a cylinder 41 having a certain capacity therein; a piston 42 arranged in the cylinder 41 and connected to the driving motor 60 by a mechanism 70 thus to reciprocate in the cylinder 41, for varying the inner capacity of the cylinder 41; a suction port 43 installed at one side of the cylinder 41 to be connected to the third conduit 3, for sucking gas introduced through the third conduit 3 into the cylinder 41; a discharge port 44 for discharging gas inside the cylinder 41; and a valve assembly 45 installed between the cylinder 41 and the suction port 43 and the discharge port 44, for controlling a suction and discharge of gas.

The valve assembly 45 is composed of: a valve plate 45a installed at one end of the cylinder 41 and respectively provided with a suction opening 45b connected to the suction port 43 and a discharge opening 45c connected to the discharge port 44; and elastic open/close members 45d and 45e installed at the valve plate 45a for respectively covering the suction opening 45b and the discharge opening 45c.

The second discharge unit 50 includes: a cylinder 51 having a certain capacity therein; a piston 52 arranged in the cylinder 51 and connected to the driving motor 60 by the mechanism 70 thus to reciprocate in the cylinder 51, for varying the inner capacity of the cylinder 51; a suction port 53 installed at one side of the cylinder 51 to be connected to the fourth conduit 4, for sucking gas introduced through the fourth conduit 4 into the cylinder 51; a discharge port 54 for discharging gas inside the cylinder 51; and a valve assembly 55 installed between the cylinder 51 and the suction port 53 and the discharge port 54, for controlling a suction and discharge of gas.

The valve assembly 55 is composed of: a valve plate 55a installed at one end of the cylinder 51 and respectively provided with a suction opening 55b connected to the suction port 53 and a discharge opening 55c connected to the discharge port 54; and elastic open/close members 55d and 55e installed at the valve plate 55a for respectively covering the suction opening 55b and the discharge opening 55c.

The mechanism 70 is composed of: a rotation shaft 71 extended to both sides of the driving motor 60; a crank arm 72 connected to the rotation shaft 71 thus to be rotated; a crank shaft 73 connected to the crank arm 72 with an eccentric state from the rotation center of the crank arm 72; and a connecting rod 74 connected to the crank shaft 73 and the pistons 42 and 52. The mechanism 70 converts a rotation motion of the driving motor 60 into a linear reciprocation of the pistons 42 and 52.

Figure 4:
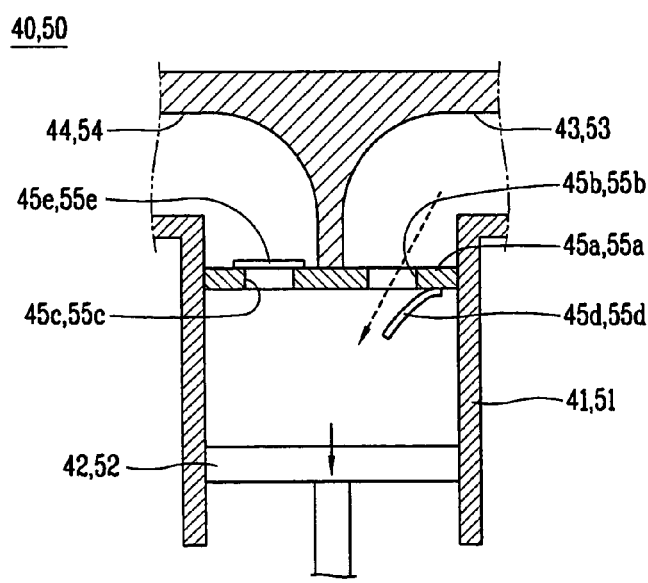
FIGS. 4 and 5 are operation state views of the vacuum pump provided at the gas separation apparatus according to the present invention.
Figure 5:
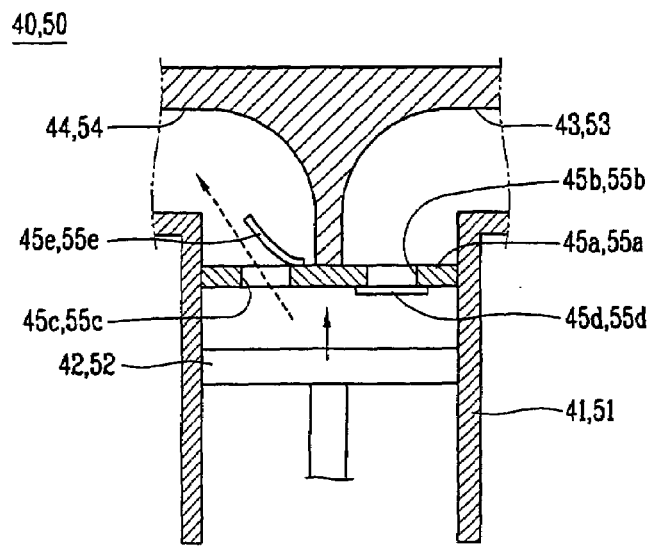

As shown in FIGS. 4 and 5, the first and second discharge units 40 and 50 are operated as follows. First, capacities inside the cylinders 41 and 51 are varied by a linear reciprocation of the pistons 42 and 52, and gas is sucked into the cylinders 41 and 51 through the suction ports 43 and 53 and discharged through the discharge ports 44 and 54. The open/close members 45d, 55d, 45e, and 55e are elastically deformed by pressures inside the cylinders 41 and 51, thereby opening or closing the suction opening 45b and 55b and the discharge openings 45c and 55c.

The pistons 42 and 52 of the first and second discharge units 40 and 50 can reciprocate in the same direction or in a different direction from each other. That is, the pistons 42 and 52 can reciprocate separately from each other.

The first discharge unit 40 discharges gas that is not absorbed by the absorbent in the first and second absorption beds 11 and 12. The second discharge unit 50 reduces pressures inside the first and second absorption beds 11 and 12 thus to form a vacuum state, and detaches gas sucked by the absorbent in the first and second absorption beds 11 and 12 from the absorbent thus to discharge. According to this, a suction pressure of the first discharge unit 40 has to be a degree that gas absorbed by the absorbent in the first and second absorption beds 11 and 12 is not detached from the absorbent. Also, a suction pressure of the second discharge unit 50 has to be enough for gas absorbed by the absorbent in the first and second absorption beds 11 and 12 to be detached from the absorbent. Therefore, it is preferable that the suction pressure of the second discharge unit 50 is set to be greater than that of the first discharge unit 40.

The suction pressure of the second discharge unit 50 can be greater than that of the first discharge unit 40 by several methods. As a representative example, a stroke distance of the piston 52 of the second discharge unit 50 can be longer than that of the piston 42 of the first discharge unit 40 by controlling the crank arm 72 or the connecting rod 74 of the mechanism 70, or a capacity of the cylinder 51 of the second discharge unit 50 can be greater than that of the cylinder 41 of the first discharge unit 40.

Hereinafter, operation of the gas separation apparatus according to the present invention will be explained with reference to FIGS. 6 and 7.

Figure 6:
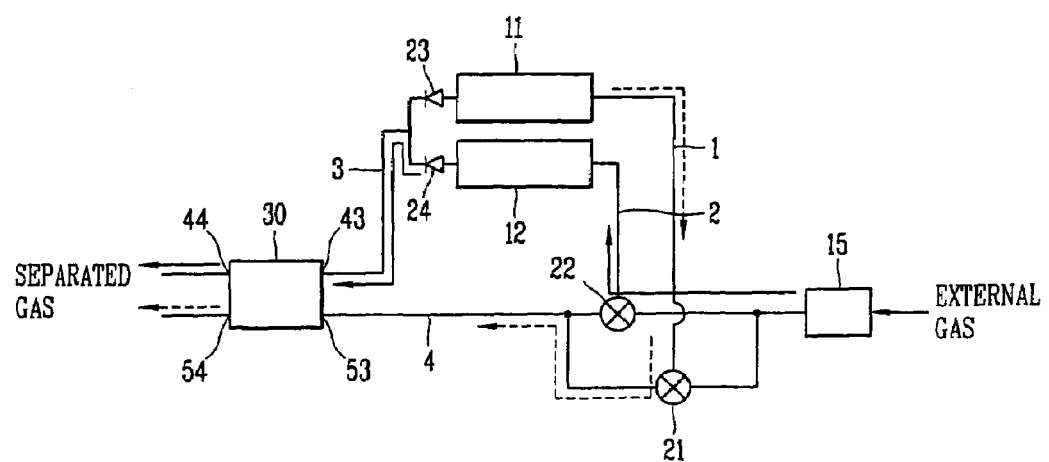
FIGS. 6 and 7 are operation state views of the gas separation apparatus according to the present invention.

As shown in FIG. 6, as the first three-way valve 21 is operated, the first absorption bed 11 and the vacuum pump 30 are connected to each other, and as the driving motor 60 is operated, the second discharge unit 50 is operated. Then, gas absorbed by the absorbent in the first absorption bed 11 is detached from the absorbent thus to be sucked into the cylinder 51 through the first and fourth conduits 1 and 4 and the suction port 53 of the second discharge unit 50, and inside of the first absorption bed 11 becomes a vacuum state. Gas inside the cylinder 51 of the second discharge unit 50 is discharged to a position that gas having a characteristic to be absorbed by an absorbent is used through the discharge port 54. Herein, gas inside the third conduit 3 is prevented from backwardly flowing to the first absorption bed 11 by the check valve 23 installed between the first absorption bed 11 and the third conduit 3.

At the same time, when the second absorption bed 12 and the filter 15 (that is, outside of the gas separation apparatus) are connected to each other as the second three-way valve 22 is operated, external gas is introduced into the second absorption bed 12 through the second conduit 2. Also, when the first discharge unit 40 is operated as the driving motor 60 is operated, gas that is not absorbed by an absorbent in the second absorption bed 12 is sucked into the cylinder 41 through the third conduit 3 and the suction port 43 of the first discharge unit 40. Then, the gas is discharged to a position that gas having a characteristic not to be absorbed by the absorbent is used through the discharge port 44.

Figure 7:
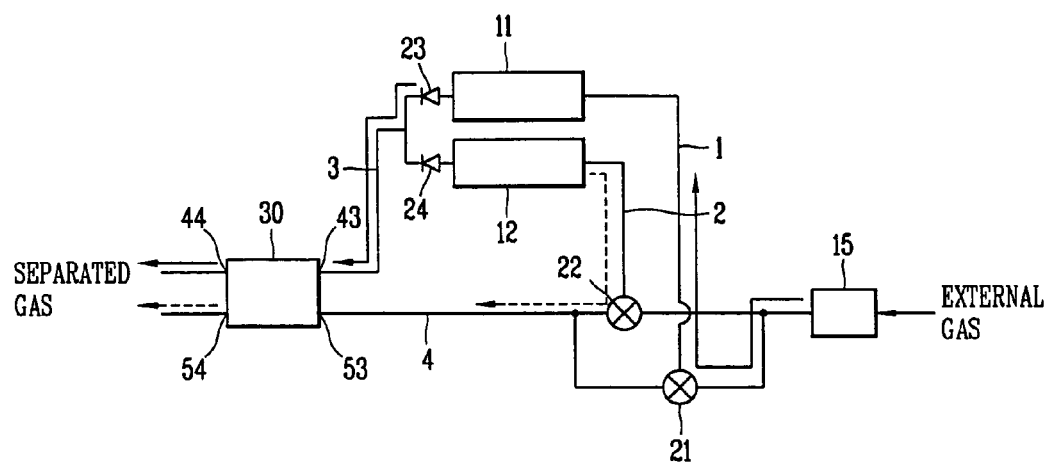

As shown in FIG. 7, when the first absorption bed 11 and the filter 15 (that is, outside of the gas separation apparatus) are connected to each other as the second three-way valve 22 is operated, external gas is introduced into the second absorption bed 12 through the second conduit 2. Also, when the first discharge unit 40 is operated as the driving motor 60 is operated, gas that is not absorbed by the absorbent in the second absorption bed 12 is sucked into the cylinder 41 through the third conduit 3 and the suction port 43 of the first discharge unit 40. Then, the gas is discharged to a position that gas having a characteristic not to be absorbed by an absorbent is used through the discharge port 44.

At the same time, when the second absorption bed 12 and the vacuum pump 30 are connected to each other as the second three-way valve 22 is operated and the second discharge unit 50 is operated as the driving motor 60 is operated, gas that has been absorbed by the absorbent in the second absorption bed 12 is detached from the absorbent thus to be introduced into the cylinder 51 through the second and fourth conduits 2 and 4 and the suction port 53 of the second discharge unit 50, and inside of the second absorption bed 12 becomes a vacuum state. Then, the gas inside the cylinder 51 of the second discharge unit 50 is discharged to a portion that gas having a characteristic to be absorbed by an absorbent is used through the discharge port 54. Herein, gas inside the third conduit 3 is prevented from backwardly flowing to the second absorption bed 12 by the check valve 24 installed between the first absorption bed 12 and the third conduit 3.

If operation periods of the first and second three-way valves 21 and 22 are alternately set, a discharge of gas having a characteristic to be absorbed by an absorbent and a discharge of gas having a characteristic not to be absorbed by an absorbent are consecutively performed by the vacuum pump 30.

Said operation is repeatedly performed, and gas that is not absorbed by the absorbent in the first and second absorption beds 11 and 12 is discharged by an operation of the first discharge unit 40 of the vacuum pump 30. Also, gas that is absorbed by the absorbent in the first and second absorption beds 11 and 12 is discharged by an operation of the second discharge unit 50 of the vacuum pump 30. In case that the absorbent has a characteristic to be absorbed with nitrogen, oxygen among the air introduced into the gas separation apparatus is discharged through the first discharge unit 40, and nitrogen is discharged through the second discharge unit 50. An absorption rate of gas absorbed by the absorbent is varied according to a kind of the absorbent, a size of the absorption bed, and a capacity of the pump, and thereby a concentration of discharged separation gas is varied.

The gas separation apparatus of the present invention is provided with a single vacuum pump for discharging gas that is absorbed by the absorbent and gas that is not absorbed by the absorbent, thereby having a simple structure and reducing an installation space.

Also, the vacuum pump is provided with two discharge units respectively having a suction port and a discharge port, thereby increasing a gas separation efficiency. Additionally, since suction pressures of the discharge units can be controlled differently, a performance of the gas separation apparatus can be optimized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A gas separation apparatus comprising:
   at least two absorption beds respectively including an absorbent for absorbing certain gas;
   at least two three-way valves respectively installed on first and second conduits for respectively connecting the absorption beds and outside of the apparatus; and
   a vacuum pump respectively connected to each end of the absorption beds via a third conduit and the three-way valves via a fourth conduit, for discharging gas absorbed by the absorbent and gas that is not absorbed by the absorbent.

2. The apparatus of claim 1, wherein the pump includes:
a first discharge unit connected to one end of the absorption bed, for discharging gas that is not absorbed by the absorbent in the absorption bed;
a second discharge unit connected to the three-way valve, for reducing an inner pressure of the absorption bed, and detaching gas that has been absorbed by the absorbent in the absorption bed from the absorbent thereby discharging; and
a driving motor for simultaneously driving the first and second discharge units.

3. The apparatus of claim 2, wherein the first and second discharge units respectively include:
a cylinder having a certain capacity therein;
a piston arranged in the cylinder and connected to the driving motor by a mechanism thus to reciprocate in the cylinder, for varying the inner capacity of the cylinder;
a suction port installed at one side of the cylinder, for sucking gas;
a discharge port installed at one side of the cylinder, for discharging gas; and
a valve assembly installed between the cylinder and the suction port and the discharge port, for controlling a suction and discharge of gas.

4. The apparatus of claim 3, wherein the valve assembly is composed of:
a valve plate respectively provided with a suction opening connected to the suction port and a discharge opening connected to the discharge port; and
elastic open/close members installed at the valve plate for respectively covering the suction opening and the discharge opening.

5. The apparatus of claim 3, wherein a capacity of the cylinder of the second discharge unit is greater than that of the cylinder of the first discharge unit.

6. The apparatus of claim 3, wherein a stroke distance of the piston of the second discharge unit is longer than that of the piston of the first discharge unit.

7. The apparatus of claim 3, wherein the mechanism is composed of:
a rotation shaft extended to both sides of the driving motor;
a crank arm connected to the rotation shaft thus to be rotated;
a crank shaft connected to the crank arm with an eccentric state from the rotation center of the crank arm; and
a connecting rod connected to the crank shaft and the piston.

8. The apparatus of claim 1, wherein the absorption bed is provided with a check valve for preventing gas from backwardly flowing at a connection portion with the pump.

9. The apparatus of claim 1, wherein a plurality of the absorption beds are installed in parallel.

10. The apparatus of claim 1, wherein the conduit that connects the absorption bed and outside of the apparatus is provided with a filter for filtering foreign materials included in external gas introduced into the absorption bed thereon.

11. A gas separation apparatus comprising:
at least two absorption beds respectively including an absorbent for absorbing certain gas;
at least two three-way valves respectively installed on conduits for respectively connecting the absorption beds and outside of the apparatus; and
a pump respectively connected to each end of the absorption beds and the three-way valves, for discharging gas absorbed by the absorbent and gas that is not absorbed by the absorbent, wherein the pump includes:
a first discharge unit connected to one end of the absorption bed, for discharging gas that is not absorbed by the absorbent in the absorption bed;
a second discharge unit connected to the three-way valve, for reducing an inner pressure of the absorption bed, and detaching gas that has been absorbed by the absorbent in the absorption bed from the absorbent thereby discharging; and
a driving motor for simultaneously driving the first and second discharge units, and wherein the first and second discharge units respectively include:
a cylinder having a certain capacity therein;
a piston arranged in the cylinder and connected to the driving motor by a mechanism thus to reciprocate in the cylinder, for varying the inner capacity of the cylinder;
a suction port installed at one side of the cylinder, for sucking gas;
a discharge port installed at one side of the cylinder, for discharging gas; and
a valve assembly installed between the cylinder and the suction port and the discharge port, for controlling a suction and discharge of gas.

12. The apparatus of claim 11, wherein the valve assembly is composed of:
a valve plate respectively provided with a suction opening connected to the suction port and a discharge opening connected to the discharge port; and
elastic open/close members installed at the valve plate for respectively covering the suction opening and the discharge opening.

13. The apparatus of claim 11, wherein a capacity of the cylinder of the second discharge unit is greater than that of the cylinder of the first discharge unit.

14. The apparatus of claim 11, wherein a stroke distance of the piston of the second discharge unit is longer than that of the piston of the first discharge unit.

15. The apparatus of claim 11, wherein the mechanism is composed of:
a rotation shaft extended to both sides of the driving motor;
a crank arm connected to the rotation shaft thus to be rotated;
a crank shaft connected to the crank arm with an eccentric state from the rotation center of the crank arm; and
a connecting rod connected to the crank shaft and the piston.

* * * * *